US011629269B2

(12) United States Patent
Hamakubo et al.

(10) Patent No.: US 11,629,269 B2
(45) Date of Patent: *Apr. 18, 2023

(54) RESIN COMPOSITION, SECONDARY COATING MATERIAL FOR OPTICAL FIBER, AND OPTICAL FIBER

(71) Applicant: SUMITOMO ELECTRIC INDUSTRIES, LTD., Osaka (JP)

(72) Inventors: Katsushi Hamakubo, Osaka (JP); Yuya Homma, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 496 days.

This patent is subject to a terminal disclaimer.

(21) Appl. No.: 16/637,512

(22) PCT Filed: Apr. 2, 2019

(86) PCT No.: PCT/JP2019/014681
§ 371 (c)(1),
(2) Date: Feb. 7, 2020

(87) PCT Pub. No.: WO2019/194198
PCT Pub. Date: Oct. 10, 2019

(65) Prior Publication Data
US 2020/0216714 A1   Jul. 9, 2020

(30) Foreign Application Priority Data

Apr. 2, 2018   (JP) .............................. JP2018-070649

(51) Int. Cl.
| | | |
|---|---|---|
| *G02B 6/02* | (2006.01) | |
| *C08F 2/46* | (2006.01) | |
| *C08F 2/50* | (2006.01) | |
| *C08G 61/04* | (2006.01) | |
| *C09D 175/14* | (2006.01) | |
| *C09D 7/40* | (2018.01) | |
| *C03C 25/47* | (2018.01) | |
| *C09D 7/62* | (2018.01) | |
| *C03C 13/04* | (2006.01) | |
| *C03C 25/1065* | (2018.01) | |
| *C03C 25/326* | (2018.01) | |
| *C03C 25/48* | (2006.01) | |
| *C08G 18/12* | (2006.01) | |
| *C08G 18/48* | (2006.01) | |
| *C08G 18/66* | (2006.01) | |
| *C08G 18/67* | (2006.01) | |
| *C08G 18/76* | (2006.01) | |
| *C08K 3/36* | (2006.01) | |
| *C08K 9/04* | (2006.01) | |
| *C09D 4/00* | (2006.01) | |

(52) U.S. Cl.
CPC ............ *C09D 175/14* (2013.01); *C03C 13/04* (2013.01); *C03C 25/1065* (2013.01); *C03C 25/326* (2013.01); *C03C 25/47* (2018.01); *C03C 25/48* (2013.01); *C08G 18/12* (2013.01); *C08G 18/4825* (2013.01); *C08G 18/6666* (2013.01); *C08G 18/6755* (2013.01); *C08G 18/7614* (2013.01); *C08K 3/36* (2013.01); *C08K 9/04* (2013.01); *C09D 4/00* (2013.01); *C09D 7/62* (2018.01); *C09D 7/68* (2018.01); *G02B 6/02395* (2013.01); *C03C 2213/00* (2013.01); *C08K 2201/005* (2013.01)

(58) Field of Classification Search
CPC ...... C09D 175/14; C09D 175/04; C09D 7/61; C09D 7/62; C09D 7/68; C09D 4/06; C09D 4/00; C03C 35/47; C03C 35/1065; C03C 35/326; C03C 35/48; C03C 13/04; C03C 2213/00; C08G 18/6755; C08G 18/7614; C08G 18/672; C08G 18/6666; C08G 18/7621; C08G 18/4825; C08G 18/12; C08G 18/48; C08K 3/36; C08K 3/22; C08K 9/04; C08K 2003/2237; C08K 2003/2231; C08K 2003/2244; C08K 2003/222; C08K 2003/2296; C08K 2003/2227; C08K 2201/005; G02B 6/02395; C08F 290/067; C08F 220/1818; C08F 220/301
USPC ........ 385/123; 522/6, 189, 184, 71, 1; 520/1
See application file for complete search history.

(56) References Cited

U.S. PATENT DOCUMENTS

| | | | | |
|---|---|---|---|---|
| 5,908,873 | A * | 6/1999 | Shustack | ................ G02B 1/048 385/115 |
| 6,304,705 | B1 | 10/2001 | Kalish et al. | |
| 7,238,731 | B2 | 7/2007 | Ramsey | |
| 2005/0148676 | A1* | 7/2005 | Doi | .......................... G02B 1/04 520/1 |
| 2005/0196605 | A1 | 9/2005 | Ramsey | |
| 2005/0282938 | A1 | 12/2005 | Yamaguchi et al. | |

(Continued)

FOREIGN PATENT DOCUMENTS

| | | |
|---|---|---|
| EP | 0 780 712 A2 | 6/1997 |
| EP | 1930381 A1 | 6/2008 |

(Continued)

OTHER PUBLICATIONS

Kosa et al, WO 2014084093 Machine Translation, Jun. 5, 2014 (Year: 2014).*

(Continued)

*Primary Examiner* — Jessica Whiteley
(74) *Attorney, Agent, or Firm* — Faegre Drinker Biddle & Reath LLP

(57) ABSTRACT

A resin composition comprises a base resin containing an urethane (meth)acrylate oligomer, a monomer having a phenoxy group, and a photopolymerization initiator, and hydrophobic inorganic oxide particles, wherein the viscosity is 300 mPa·s or more and 4200 mPa·s or less at 45° C. and the content of the monomer having a phenoxy group is 1% by mass or more and 30% by mass or less based on the total amount of the base resin.

9 Claims, 1 Drawing Sheet

(56) References Cited

U.S. PATENT DOCUMENTS

| | | | |
|---|---|---|---|
| 2006/0084716 A1 | 4/2006 | Zahora et al. | |
| 2006/0088263 A1 | 4/2006 | Tanaka et al. | |
| 2008/0045623 A1 | 2/2008 | Yamaguchi et al. | |
| 2012/0321265 A1 | 12/2012 | Terruzzi et al. | |
| 2018/0128970 A1 | 5/2018 | Homma et al. | |
| 2020/0262749 A1* | 8/2020 | Hamakubo | C09D 175/16 |
| 2021/0053870 A1* | 2/2021 | Hamakubo | C03C 25/285 |
| 2021/0179762 A1* | 6/2021 | Hamakubo | C08F 290/067 |

FOREIGN PATENT DOCUMENTS

| | | | | |
|---|---|---|---|---|
| EP | 3 778 682 A1 | 2/2021 | | |
| JP | S63-002834 A | 1/1988 | | |
| JP | H02-69706 A | 3/1990 | | |
| JP | H5-505202 A | 8/1993 | | |
| JP | H8-109229 A | 4/1996 | | |
| JP | H9-241341 A | 9/1997 | | |
| JP | H9-297225 A | 11/1997 | | |
| JP | H11-513327 A | 11/1999 | | |
| JP | 2000-007717 A | 1/2000 | | |
| JP | 2000-26562 A | 1/2000 | | |
| JP | 2001-066474 A | 3/2001 | | |
| JP | 2003-315639 A | 11/2003 | | |
| JP | 2004-204206 A | 7/2004 | | |
| JP | 2005-301237 A | 10/2005 | | |
| JP | 2007-46047 A | 2/2007 | | |
| JP | 2010-511770 A | 4/2010 | | |
| JP | 2012-219110 A | 11/2012 | | |
| JP | 2013-197163 A | 9/2013 | | |
| JP | 2014-219550 A | 11/2014 | | |
| WO | WO-90/13579 A1 | 11/1990 | | |
| WO | WO-96/11217 A1 | 4/1996 | | |
| WO | WO-97/11922 A1 | 4/1997 | | |
| WO | WO-98/41483 A1 | 9/1998 | | |
| WO | WO-00/01781 A1 | 1/2000 | | |
| WO | WO-2008/069656 A1 | 6/2008 | | |
| WO | WO-2012/158317 A2 | 11/2012 | | |
| WO | WO-2014084093 A1 * | 6/2014 | | B32B 27/30 |
| WO | WO-2016/081557 A2 | 5/2016 | | |
| WO | WO-2019/194198 A1 | 10/2019 | | |

OTHER PUBLICATIONS

K. A. Shashkeev et al., "Superhydrophobic Electrically Conductive Coatings Based On a Silicone Matrix and Carbon Nanotubes," Journal of Applied Chemistry, Aug. 16, 2017, V. 90, Issue No. 7.
U.S. Office Action dated Sep. 29, 2022 in U.S. Appl. No. 16/761,544.
Shiue J., et al., "Effects of silica nanoparticle addition to the secondary coating of dual-corted optical fibers," Acta Materialia, Jun. 2006, vol. 54, Issue 10, p. 2631-p. 2636.
Office Action dated Feb. 27, 2023 in U.S. Appl. No. 16/761,544.

* cited by examiner

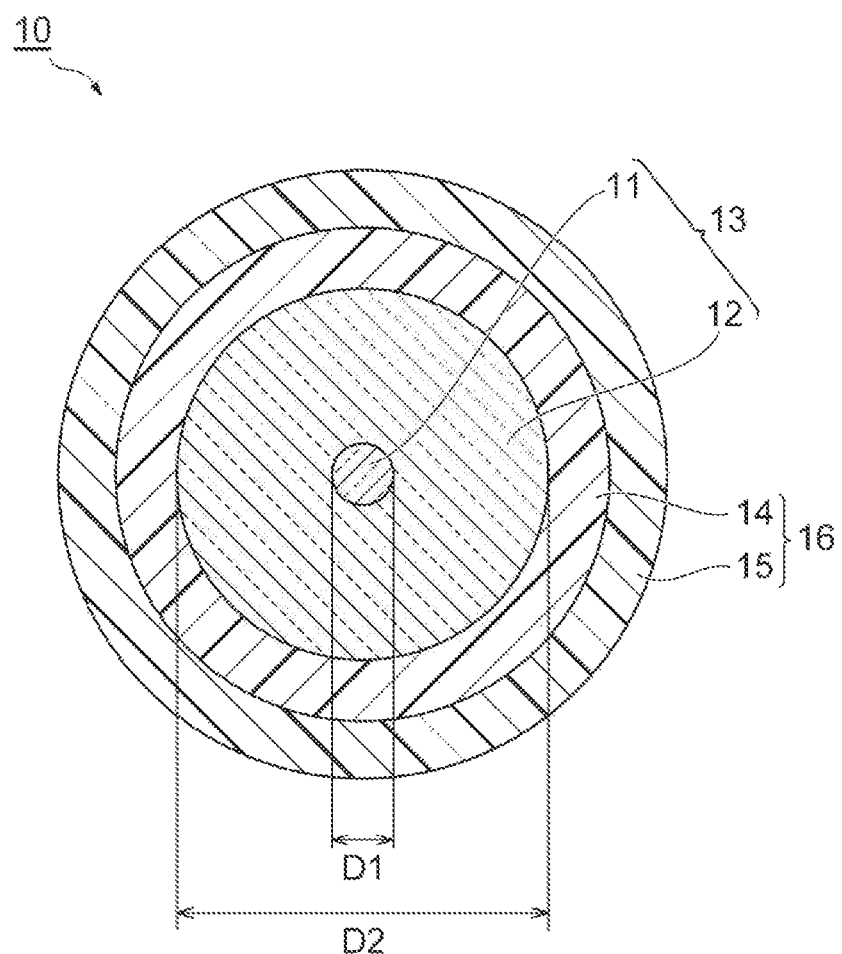

RESIN COMPOSITION, SECONDARY COATING MATERIAL FOR OPTICAL FIBER, AND OPTICAL FIBER

TECHNICAL FIELD

The present disclosure relates to a resin composition, a secondary coating material for optical fiber, and an optical fiber.

This application claims priority based on Japanese Patent Application No. 2018-070649 filed on Apr. 2, 2018, and incorporates all the contents described in the Japanese application.

BACKGROUND ART

Generally, an optical fiber has a coating resin layer for protecting a glass fiber which is an optical transmission medium. The optical fiber has been required to have excellent lateral pressure characteristics in order to reduce an increase in transmission loss induced by micro-bend generated when lateral pressure is applied to the optical fiber.

CITATION LIST

Patent Literature

Patent Literature 1: JP 2014-219550A.

SUMMARY OF INVENTION

A resin composition according to one embodiment of the present disclosure comprises a base resin containing a urethane (meth)acrylate oligomer, a monomer having a phenoxy group, and a photopolymerization initiator, and hydrophobic inorganic oxide particles, wherein the viscosity is 300 mPa·s or more and 4200 mPa·s or less at 45° C. and the content of the monomer having a phenoxy group is 1% by mass or more and 30% by mass or less based on the total amount of the base resin.

BRIEF DESCRIPTION OF DRAWINGS

FIG. 1 is a schematic cross-section diagram showing an example of the optical fiber according to the present embodiment.

DESCRIPTION OF EMBODIMENTS

[Problem to be Solved by the Present Disclosure]

A resin composition containing a filler tends to have high viscosity and poor application property. On the other hand, when the amount of the diluting monomer added is increased in order to adjust the viscosity of the resin composition, the proportion of the oligomer decreases, and the coating film formed from the resin composition tends to become brittle. In addition, when the amount of the diluting monomer added is increased, the Young's modulus of the coating film formed from the resin composition increases or decreases, or the thickness of the coating film decreases to decrease the strength of the resin layer. Therefore, the resin composition used for the coating resin layer of the optical fiber is required to satisfy both application properties and coating film properties.

An object of the present disclosure is to provide a resin composition achieving both application properties and coating film properties and an optical fiber having a coating resin layer formed from the resin composition.

[Advantageous Effects of the Present Disclosure]

The present disclosure can provide a resin composition achieving both application properties and coating film properties and an optical fiber having a coating resin layer formed from the resin composition.

[Description of Embodiments of the Present Disclosure]

First, the contents of the embodiment of the present disclosure will be described by listing. The resin composition according to one embodiment of the present disclosure comprises a base resin containing urethane (meth)acrylate oligomer, a monomer having a phenoxy group, and a photopolymerization initiator, and hydrophobic inorganic oxide particles, wherein the viscosity is 300 mPa·s or more and 4200 mPa·s or less at 45° C. and the content of the monomer having a phenoxy group is 1% by mass or more and 30% by mass or less based on the total amount of the base resin.

Such a resin composition can achieve both application properties and coating film properties. In addition, an optical fiber having excellent lateral pressure characteristics can be prepared by using the above resin composition as an ultraviolet-curable resin composition for coating the optical fiber.

In order to adjust the balance between application properties and coating film properties, the base resin may further contain a monomer having no phenoxy group. Moreover, when the viscosity of the monomer having no phenoxy group is 50 mPa·s or less at 25° C., the application properties of the resin composition is easy to be improved.

The monomer having a phenoxy group may be at least one selected from the group consisting of 2-phenoxyethyl (meth)acrylate, 3-phenoxybenzyl (meth)acrylate, phenoxydiethylene glycol (meth)acrylate, and phenoxypolyethylene glycol (meth)acrylate. Thereby, it becomes easy to adjust the balance between the application properties and the coating film properties of the resin composition.

The above inorganic oxide particles may be at least one selected from the group consisting of silicon dioxide, zirconium dioxide, aluminum oxide, magnesium oxide, titanium oxide, tin oxide and zinc oxide because these have excellent dispersibility in the resin composition and can easily form a hard coating film.

An optical fiber according to one aspect of the present disclosure comprises a glass fiber comprising a core and cladding, a primary resin layer contacting with the glass fiber and coating the glass fiber, and a secondary resin layer coating the primary resin layer and the secondary resin layer comprises the cured product of the resin composition. Application of the resin composition according to the present embodiment to the secondary resin layer can improve the lateral pressure characteristics of the optical fiber.

[Detail of Embodiment of the Present Disclosure]

Specific examples of a resin composition, a secondary coating material for optical fiber, and an optical fiber according to the present embodiment will be described referring to the drawings as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Resin Composition>

The resin composition according to the present embodiment comprises a base resin containing a urethane (meth)

acrylate oligomer, a monomer having a phenoxy group, and a photopolymerization initiator; and hydrophobic inorganic oxide particles.

(Meth)acrylate means an acrylate or a methacrylate corresponding to it. The same applies to (meth)acrylic acid or the like.

(Base Resin)

The base resin according to the present embodiment contains a monomer having a phenoxy group in an amount of 1% by mass or more and 30% by mass or less based on the total amount of the base resin. The base resin contains a monomer having a phenoxy group in such a range, which can improve application properties of the resin composition and form a coating film having a Young's modulus suitable as a resin for coating optical fiber. The content of the monomer having a phenoxy group is preferably 2% by mass or more and 28% by mass or less, and more preferably 3% by mass or more and 25% by mass or less.

Examples of the monomer having a phenoxy group include 2-phenoxyethyl (meth)acrylate, 3-phenoxybenzyl (meth)acrylate, phenoxydiethylene glycol (meth)acrylate, phenoxypolyethylene glycol (meth)acrylate, and nonylphenoxypolyethylene glycol (meth)acrylate. From the viewpoint of adjusting the balance between the application properties and the coating film properties of the resin composition, the monomer having a phenoxy group may be at least one selected from the group consisting of 2-phenoxyethyl (meth)acrylate, 3-phenoxybenzyl (meth)acrylate, phenoxydiethylene glycol (meth)acrylate, and phenoxypolyethylene glycol (meth)acrylate. Among them, 2-phenoxyethyl (meth)acrylate or 3-phenoxybenzyl (meth)acrylate is preferable as the monomer having a phenoxy group. The monomer having a phenoxy group may be used in combination of two or more.

From the viewpoint of improving the application properties of the resin composition, the viscosity of the monomer having a phenoxy group is preferably 50 mPa·s or less at 25° C., more preferably 1 mPa·s or more and 30 mPa·s or less, and still more preferably 1 mPa·s or more and 25 mPa·s or less.

The base resin may further contain a monomer having no phenoxy group. The viscosity of the monomer having no phenoxy group is preferably 50 mPa·s or less at 25° C., more preferably 1 mPa·s or more and 30 mPa·s or less, and still more preferably 1 mPa·s or more and 25 mPa·s or less. Thereby, the resin composition excellent in the balance between application properties and coating film properties can be obtained.

The monomer having no phenoxy group may be a monofunctional monomer having one polymerizable group or a polyfunctional monomer having two or more polymerizable groups. A monomer having no phenoxy group may be used by mixing two or more monomers.

Examples of the monofunctional monomer having no phenoxy group include (meth)acrylate monomers such as methyl (meth)acrylate, ethyl (meth)acrylate, propyl (meth)acrylate (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate, heterocycle containing (meth)acrylates such as N-acryloyl morpholine, N-vinyl pyrrolidone, N-vinyl caprolactam, N-acryloylpiperidine, N-methacryloylpiperidine, N-acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

From the viewpoint of adjusting the Young's modulus of the coating film formed from the resin composition, isobornyl (meth)acrylate or 4-tert-butylcyclohexanol (meth)acrylate is preferable, and isobornyl (meth)acrylate is more preferable as the monofunctional monomer.

Examples of the multifunctional monomer having no phenoxy group include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1, 8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

From the viewpoint of forming a coating film having a desired Young's modulus while reducing the viscosity of the resin composition, tripropylene glycol di(meth)acrylate, 1,6-hexanediol (meth)acrylate, and trimethylolpropane tri(meth)acrylate may be used as the polyfunctional monomer. Among them, tripropylene glycol di(meth)acrylate is preferable as the polyfunctional monomer.

The base resin contains the monomer (monomer having phenoxy group and monomer having no phenoxy group) preferably at 21% by mass or more and 45% by mass or less, and more preferably at 22% by mass or more and 43% by mass or less based on the total amount of the base resin. Containing the monomer in the above range results in easy preparation of the resin composition that is better in the balance between application properties and coating film properties.

The resin composition according to the present embodiment includes a urethane (meth)acrylate oligomer. An oligomer Obtained by, reacting a polyol compound, a polyisocyanate compound, and a hydroxyl group-containing (meth)acrylate compound can be used as the urethane (meth) acrylate oligomer.

Examples of the polyol compound include polytetramethylene glycol, polypropylene glycol and bisphenol A-ethylene oxide addition diol. The number average molecular weight of the polyol compound may be 400 to 1000. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth) acrylate, pentaerythritol tri(meth)acrylate, 2-hydroxypropyl (meth)acrylate, and tripropylene glycol mono(meth)acrylate.

An organotin compound is generally used as a catalyst for synthesizing a urethane (meth)acrylate oligomer. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When the urethane (meth)acrylate oligomer is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The resin composition according to the present embodiment may further contain an epoxy (meth)acrylate oligomer. An oligomer obtained by reacting a compound having a (meth)acryloyl group with an epoxy resin having two or more glycidyl groups can be used as the epoxy (meth) acrylate oligomer.

The photopolymerization initiator can be appropriately selected from known radical photopolymerization initiators and used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropan-1-one, 2,4,4-trimethylpentyl phosphine oxide, 2,4,4-trimethylbenzoyldiphenylphosphine oxide, 2-methyl-1-[4-(methylthio)phenyl]-2-morpholinopropan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

(Inorganic Oxide Particle)

The inorganic oxide particles according to the present embodiment are spherical particles having a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group, or a non-reactive group such as a hydrocarbon group (for example, an alkyl group) or an aryl group (for example, a phenyl group). In the ease of the inorganic oxide particles having a reactive group, the resin layer having high Young's modulus is easy to form.

The inorganic oxide particles according to the present embodiment are dispersed in a dispersion medium. Using the inorganic oxide dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

As the reactive dispersion medium, a monomer such as a (meth)acryloyl compound and an epoxy compound may be used. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. As the (meth)acryloyl compound, compounds exemplified by monomers described above may be used.

The non-reactive dispersion medium may include a ketone solvent such as methyl ethyl ketone (MEK), an alcohol solvent such as propylene glycol monomethyl ether (PGME), or an ester solvent such as propylene glycol monomethyl ether acetate (PGMEA). In the case of the non-reactive dispersion medium, the resin composition may be prepared by mixing the base resin and the inorganic oxide particles dispersed in the dispersion medium and removing a part of the dispersion medium. When the dispersion medium including the inorganic oxide particles is observed with an optical microscope (about 100 times magnification) and particles are not observed, the inorganic oxide particles are regarded to be dispersed as the primary particles.

Due to excellent dispersion properties in the resin composition and easy formation of the hard coating film, it is preferable that the above inorganic oxide particles are at least one selected from the group consisting of silicon dioxide (silica zirconium dioxide (zirconia), aluminum oxide (alumina), magnesium oxide (magnesia), titanium oxide (titanic), tin oxide, and zinc oxide. From the viewpoint of excellent inexpensiveness, easy surface treatment, permeability to ultraviolet ray, and easy provision of a resin layer with appropriate hardness, hydrophobic silica particles are more preferable to be used as the inorganic oxide particles according to the present embodiment.

From the view point of increasing a Young's modulus of the resin layer, the average primary particle diameter of the inorganic oxide particles is preferably 200 nm or less, more preferably 5 nm or more and 200 nm or less, and further preferably 10 nm or more and 100 nm or less. The average primary particle diameter can be measured with image analysis of electron, microscope pictures, a light scattering method and the BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded. However, the precipitate is not Observed.

The content of the inorganic oxide particles is preferably 1% by mass or more and 60% by mass or less, more preferably 7% by mass or more and 50% by mass or less, and still more preferably 9% by mass or more and 40% by mass or less based on the total amount of the resin composition. The content of the inorganic oxide particles of 1% by mass or more allows for easy formation of the resin layer having excellent lateral pressure characteristics. The content of the inorganic oxide particles is 60% by mass or less, resulting in easy improvement in the application properties of the resin composition.

The resin composition may further contain a silane coupling agent, a photoacid generator, a leveling agent, an antifoaming agent, an antioxidant, or the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxy silane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

As the photoacid generator, an onium salt having an $A^+B^-$ structure may be used. Examples of the photoacid generator include sulfonium salts such as UVACURE 1590 (manufactured by Daicel-Cytec), CPI-100P, 110P, 210S (San-Apra Ltd.) and iodonium salts such as Omnicat 250 (manufactured by IGM Resins), WPI-113 (manufactured by FUJIFILM Wako Pure Chemical Corporation), Rp-2074 (manufactured by Rhodia Japan. Ltd.).

The viscosity of the resin composition according to the present embodiment is 300 mPa·s or more and 4200 mPa·s or less at 45° C., preferably 400 mPa·s or more and 4000 mPa·s or less, and more preferably 500 mPa·s or more and 3500 mPa·s or less. The viscosity of the resin composition is in the above range, which can improve the application properties of the resin composition.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica can be used, for example, in the core 11, and pure silica or fluorine-added silica can be used in the cladding 12.

In FIG. 1, for example, the outside diameter (D2) of the glass fiber 13 is about 125 μm, and the diameter (D1) of the core 11 constituting the glass fiber 13 is about 7 to 15 μm.

The thickness of the coating resin layer 16 is typically about 60 to 70 μm. The thickness of each of the primary resin layer 14 and the secondary resin layer 15 may be about 10 to 50 and for example, the thickness of the primary resin layer 14 may be 35 μm and the thickness of the secondary resin layer 15 may be 25 μm. The outside diameter of the optical fiber 10 may be about 245 to 265 μm.

The resin composition according to the present embodiment can be applied to the secondary resin layer. The secondary resin layer can be formed by curing a resin composition including the above base resin and inorganic oxide particles. The resin composition according to the present embodiment is suitable as a secondary coating material for optical fiber. Accordingly, the lateral pressure characteristics of the optical fiber can be improved.

The Young's modulus of the secondary resin layer is preferably 1300 MPa or more at 23° C., more preferably 1300 to 2600 MPa, and further preferably 1300 to 2500 MPa. The Young's modulus of the secondary resin layer of 1300 MPa or more is easy to improve the lateral pressure characteristics, and the Young's modulus of 2600 MPa or less is hard to cause a crack or the like in the secondary resin layer due to provision of appropriate toughness with the secondary resin layer.

The inorganic oxide particles dispersed in the dispersion medium remain to be dispersed in the resin layer even after curing of the resin layer. When reactive dispersion medium is used, the inorganic oxide particles are mixed together with the dispersion medium into the resin layer and are incorporated in the resin layer with the dispersion condition maintained. When non-reactive dispersion medium is used, at least a part of the dispersion medium evaporates and disappears from the resin composition. However, the inorganic oxide particles remain in the resin composition with the dispersion condition remained and are also present in the postcure resin layer with the dispersion condition, remained. Electron microscopic observation shows that the primary particle of the inorganic oxide particles present in the resin layer is dispersed.

The primary resin layer 14 can be formed by curing a resin composition including a urethane (meth)acrylate oligomer, a monomer, a photopolymerization initiator and a silane coupling agent. Prior art techniques can be used for a resin composition for the primary resin layer. A urethane (meth)acrylate oligomer, a monomer, a photopolymerization initiator and a silane coupling agent may be appropriately selected from compounds exemplified in the above base resin. The resin composition constituting the primary resin layer has composition different from the base resin forming the secondary resin layer.

EXAMPLES

Hereinafter, the results of evaluation test using Examples and Comparative Examples according to the present disclosure will be shown, and the present disclosure is described in more detail. The present invention is not limited to these examples.

(Oligomer)

As the oligomer, a urethane acrylate oligomer (UA) obtained by reacting a polypropylene glycol having a molecular weight of 600, 2,4-tolylene diisocyanate, and hydroxyethyl acrylate, and an epoxy acrylate oligomer (EA) were prepared.

(Monomer Having a Phenoxy Group)

As a monomer having a phenoxy group, 3-phenoxybenzyl acrylate (trade name "Light Acrylate POB-A" of Kyoeisha Chemical Co., Ltd.), 2-phenoxyethyl acrylate (trade name "Light Acrylate PO-A" of Kyoeisha Chemical Co., Ltd.), phenoxydiethylene glycol acrylate (trade name "Light Acrylate P2H-A" of Kyoeisha Chemical Co., Ltd.), and phenoxy polyethylene glycol acrylate (trade name "Light acrylate P-200A" of Kyoeisha Chemical Co., Ltd.) were prepared.

(Monomer Having No Phenoxy Group)

As a monomer having no phenoxy group, isobornyl acrylate (trade name "IBXA" of Osaka Organic Chemical Industry Co., Ltd.) and tripropylene glycol diacrylate (trade name "TPGDA" of Daicel-Allnex Co., Ltd.) were prepared.

(Photopolymerization Initiator)

As a photopolymerization initiator, 1-hydroxycyclohexyl phenyl ketone and 2,4,6-trimethylbenzoyldiphenylphosphine oxide were prepared.

(Inorganic Oxide Particle)

As inorganic oxide particles, hydrophobic silica particles having an average particle size of 70 to 100 nm, hydrophobic silica particles having an average particle size of 40 to 60 nm, and hydrophobic silica particles having an average particle size of 10 to 15 nm were prepared. These silica particles had a methacryloyl group and were dispersed in methyl ethyl ketone (MEK).

[Preparation of Resin Composition]

The base resin was prepared by mixing the above oligomer, monomer, and photopolymerization initiator. The base resin and the silica particles were mixed, and then most of MEK as a dispersion medium was removed under reduced pressure to prepare the respective resin compositions. The content of MEK in the resin composition was 5% by mass or less.

In Table 1 and Table 2, the value of the monomer is the content based on the total amount of the base resin, the value of the oligomer is the content based on the total amount of the monomer, oligomer, and silica particles, and the value of silica particles is the content based on the total amount of the resin composition.

The following evaluation was conducted using the resin compositions obtained in Examples and Comparative Examples. The results are shown in Tables 1 and 2.

(Viscosity)

The viscosity at 45° C. of the resin composition was measured by using a "digital viscometer DV-II" of Brookfield Co., Ltd. (spindle used: No. 18 and rotation speed: 10 rpm) which is a B-type viscometer.

(Young's Modulus)

Each of the resin composition was applied onto a polyethylene terephthalate (PET) film by using a spin coater, and then cured using an electrodeless UV lamp system "VPS6 (D bulb)" manufactured by Heraeus at a condition of 1000±100 mJ/cm$^2$ to form a resin layer having a thickness of 200±20 μm (a coating film) on the PET film. The resin layer was peeled off from the PET film to obtain a resin film.

A resin film was punched into a dumbbell shape of KS K 7127 type 5 and pulled under a condition of 23±2° C. and 50±10% REI using a tensile tester at a tension speed of 1 mm/min and a gauge length of 25 mm, and a stress-strain curve was obtained. Young's modulus was determined by 2.5% secant line.

[Preparation of Optical Fiber]

A resin composition A1 was obtained by mixing 75 parts by mass of a urethane acrylate oligomer obtained by reacting polypropylene glycol having a molecular weight of 2000, 2,4-tolylene diisocyanate, hydroxyethyl acrylate, and methanol; 12 parts by mass of nonylphenoxypolyethylene glycol acrylate; 6 parts by mass of N-vinyl caprolactam; 2 parts by mass of 1,6-hexanediol diacrylate; 1 part by mass of 2,4,6-trimethylbenzoyldiphenylphosphine oxide (Omnirad TPO); and 1 part by mass of 3-mercaptopropyltrimethoxysilane (MPTS).

A primary resin layer having a thickness of 35 μm was formed on the outer periphery of a glass fiber having a diameter of 125 μm and composed of the core and the cladding by using the resin composition A1, each of the resin composition prepared in Examples or Comparative Examples was further applied onto the outer periphery of the primary resin layer to form a secondary resin layer, and an optical fiber was produced. The linear speed was set at 1500 m/min.

(Application Property)

For the produced optical fiber, the application properties of the resin composition were evaluated by confirming the presence or absence of a disconnection. The case where there was no disconnection was regarded as "OK", and the case where the disconnection was confirmed was regarded as "NG", When the viscosity of the resin composition is too high, the coating diameter in forming the secondary resin layer is not stable, and disconnection is easy to occur. On the other hand, when the viscosity of the resin composition is too low, the self-aligning force is difficult to work and uneven thickness is easy to occur.

TABLE 1

| Examples | | 1 | 2 | 3 | 4 | 5 | 6 | 7 | 8 | 9 | 10 | 11 | 12 |
|---|---|---|---|---|---|---|---|---|---|---|---|---|---|
| Oligomer (% by mass) | UA | 29.1 | 28.5 | 27 | 27 | 27 | 27 | 31.5 | 24 | 22.5 | 37.2 | 41 | 31.2 |
| | EA | 8.7 | 8.6 | 8.1 | 8.1 | 8.1 | 8.1 | 9.5 | 7.2 | 6.8 | 11.1 | — | — |
| Monomer having a phenoxy group (% by mass) | POB-A | — | — | — | 10 | — | — | — | — | — | — | — | — |
| | PO-A | 3 | 5 | 10 | — | — | — | 10 | 20 | 25 | 16.7 | 10 | 20 |
| | P2H-A | — | — | — | — | 10 | — | — | — | — | — | — | — |
| | P-200A | — | — | — | — | — | 10 | — | — | — | — | — | — |
| Monomer having no phenoxy group (% by mass) | | 20.4 | 20.0 | 18.9 | 18.9 | 18.9 | 18.9 | 22.1 | 16.8 | 15.8 | 26.0 | 22.1 | 16.8 |
| Silica particles (% by mass) | | 40 | 40 | 40 | 40 | 40 | 40 | 30 | 40 | 40 | 9 | 30 | 40 |
| Average particle size of silica particles (nm) | | 70-100 | 40-60 | 10-15 | 10-15 | 10-15 | 10-15 | 10-15 | 10-15 | 10-15 | 10-15 | 10-15 | 10-15 |
| Viscosity at 45° C. (mPa · s) | | 2000 | 2200 | 2580 | 2740 | 2580 | 2580 | 1100 | 1200 | 1200 | 500 | 1150 | 1200 |
| Young's modulus (MPa) | | 1900 | 1980 | 2300 | 2350 | 2000 | 1800 | 1900 | 2300 | 2300 | 1500 | 1800 | 2100 |
| Application property | | OK | OK | OK | OK | OK | OK | OK | OK | OK | OK | OK | OK |

TABLE 2

| Comparative Examples | | 1 | 2 | 3 | 4 |
|---|---|---|---|---|---|
| Oligomer (% by mass) | UA | 30 | 30 | 30 | 20.7 |
| | EA | 9 | 9 | 9 | 6.2 |
| Monomer having a phenoxy group (% by mass) | POB-A | — | — | — | — |
| | PO-A | — | — | — | 31 |
| | P2H-A | — | — | — | — |
| | P-200A | — | — | — | — |
| Monomer having no phenoxy group (% by mass) | | 21 | 21 | 21 | 14.5 |
| Silica particles (% by mass) | | 40 | 40 | 40 | 40 |
| Average particle size of silica particles (nm) | | 70-100 | 40-60 | 10-15 | 10-15 |
| Viscosity at 45° C. (mPa·s) | | 4200 | 5530 | 6400 | 200 |
| Young's modulus (MPa) | | 1950 | 2000 | 2250 | 2300 |
| Application property | | NG | NG | NG | NG |

It was confirmed that the resin composition in Examples achieved, both application properties and coating film properties.

REFERENCE SIGNS LIST

10: Optical fiber, 11: Core, 12: Clad, 13: Glass fiber, 14: Primary resin layer, 15: Secondary resin layer, 16: Coating resin layer.

The invention claimed is:

1. A resin composition comprising a base resin containing a urethane (meth)acrylate oligomer, a monomer having a phenoxy group, and a photopolymerization initiator, and hydrophobic inorganic oxide particles, wherein
    a viscosity is 300 mPa·s or more and 4200 mPa·s or less at 45° C.,
    a content of the monomer having a phenoxy group is 1% by mass or more and 30% by mass or less based on the total amount of the base resin
    the resin composition is used to form a secondary resin layer of an optical fiber, and
    the Young's modulus of a cured product of the resin composition is 1300 to 2600 MPa at 23° C.

2. The resin composition according to claim 1, wherein the base resin further contains a monomer having no phenoxy group.

3. The resin composition according to claim 2, wherein a viscosity of the monomer having no phenoxy group is 50 mPa·s or less at 25° C.

4. The resin composition according to claim 1, wherein the monomer having a phenoxy group is at least one selected from the group consisting of 2-phenoxyethyl (meth)acrylate, 3-phenoxybenzyl (meth)acrylate, phenoxydiethylene glycol (meth) acrylate, and phenoxypolyethylene glycol (meth) acrylate.

5. The resin composition according to claim 1, wherein the inorganic oxide particles are at least one selected from the group consisting of silicon dioxide, zirconium dioxide, aluminum oxide, magnesium oxide, titanium oxide, tin oxide, and zinc oxide.

6. The resin composition according to claim 1, wherein an average primary particle diameter of the inorganic oxide particles is 200 nm or less.

7. The resin composition according to claim 1, wherein a content of the inorganic oxide particles is 1% by mass or more and 60% by mass or less based on the total amount of the resin composition.

8. A secondary coating material for optical fiber, comprising the resin composition according to claim 1.

9. An optical fiber comprising:
    a glass fiber comprising a core and cladding;
    a primary resin layer contacting with the glass fiber and coating the glass fiber; and
    the secondary resin layer coating the primary resin layer, wherein the secondary resin layer comprises a cured product of the resin composition according to claim 1.

* * * * *